United States Patent
Beutter et al.

(10) Patent No.: US 6,974,137 B2
(45) Date of Patent: Dec. 13, 2005

(54) FLAT GASKET, IN PARTICULAR EXHAUST MANIFOLD GASKET, AND ASSEMBLY ACCOMMODATING SUCH A GASKET

(75) Inventors: Ulrich Beutter, Reutlingen-Reicheneck (DE); Wolfgang Eben, Münsingen-Apfelstetten (DE); Wilhelm Kullen, Hülben (DE); Uwe-Georg Klump, Dettingen/Erms (DE)

(73) Assignee: ElringKlinger AG, Dettingen (DE)

( * ) Notice: Subject to any disclaimer, the term of this patent is extended or adjusted under 35 U.S.C. 154(b) by 83 days.

(21) Appl. No.: 10/431,203

(22) Filed: May 7, 2003

(65) Prior Publication Data

US 2004/0113370 A1 Jun. 17, 2004

(30) Foreign Application Priority Data

Dec. 13, 2002 (DE) .......................... 102 58 319

(51) Int. Cl.[7] .............................................. F02F 11/00
(52) U.S. Cl. ........................................ 277/598; 277/594
(58) Field of Search ................................ 277/594, 595, 277/598

(56) References Cited

U.S. PATENT DOCUMENTS

| | | | |
|---|---|---|---|
| 4,103,913 A | | 8/1978 | McDowell .................. 277/235 |
| 4,765,634 A | * | 8/1988 | Kobayashi et al. ......... 277/595 |
| 5,344,165 A | * | 9/1994 | Miyaoh et al. ............. 277/595 |
| 5,375,856 A | * | 12/1994 | Ishikawa et al. ............ 277/591 |
| 5,427,389 A | * | 6/1995 | Ishikawa et al. ............ 277/595 |
| 5,566,548 A | * | 10/1996 | Khurana ....................... 60/322 |
| 5,636,515 A | * | 6/1997 | Matsumoto et al. .......... 60/323 |
| 5,711,537 A | * | 1/1998 | Inamura et al. ............. 277/595 |
| 5,794,945 A | * | 8/1998 | Kubouchi et al. .......... 277/593 |
| 6,189,895 B1 | | 2/2001 | Yamada ...................... 277/591 |
| 6,371,490 B1 | * | 4/2002 | Baron et al. ................ 277/598 |

FOREIGN PATENT DOCUMENTS

| | | |
|---|---|---|
| DE | 10118110 | 12/2002 |
| EP | 0658712 | 6/1995 |
| EP | 1136732 | 9/2001 |
| JP | 60047851 | 3/1985 |
| JP | 07102965 | 4/1995 |

* cited by examiner

Primary Examiner—Alison K. Pickard

(57) ABSTRACT

Flat gasket with a gasket plate comprising at least one sheet metal layer, in which fluid passage openings, screw holes adjacent to these and elastically deformable sealing elements enclosing the fluid passage openings are formed. On the one hand, to impede as little as possible sliding movements of the components to be arranged on either side of the flat gasket relative to one another and to the flat gasket, and, on the other hand, to create a fixed point for the assembled flat gasket, the flat gasket is designed such that the gasket plate has for at least a first one of its fluid passage openings in the area of a screw hole adjacent to this opening a spring element which is capable of elastic deformation perpendicularly to the gasket plate, and that the gasket plate has for at least a second one of its fluid passage openings adjacent thereto a screw hole which is without a spring element.

13 Claims, 4 Drawing Sheets

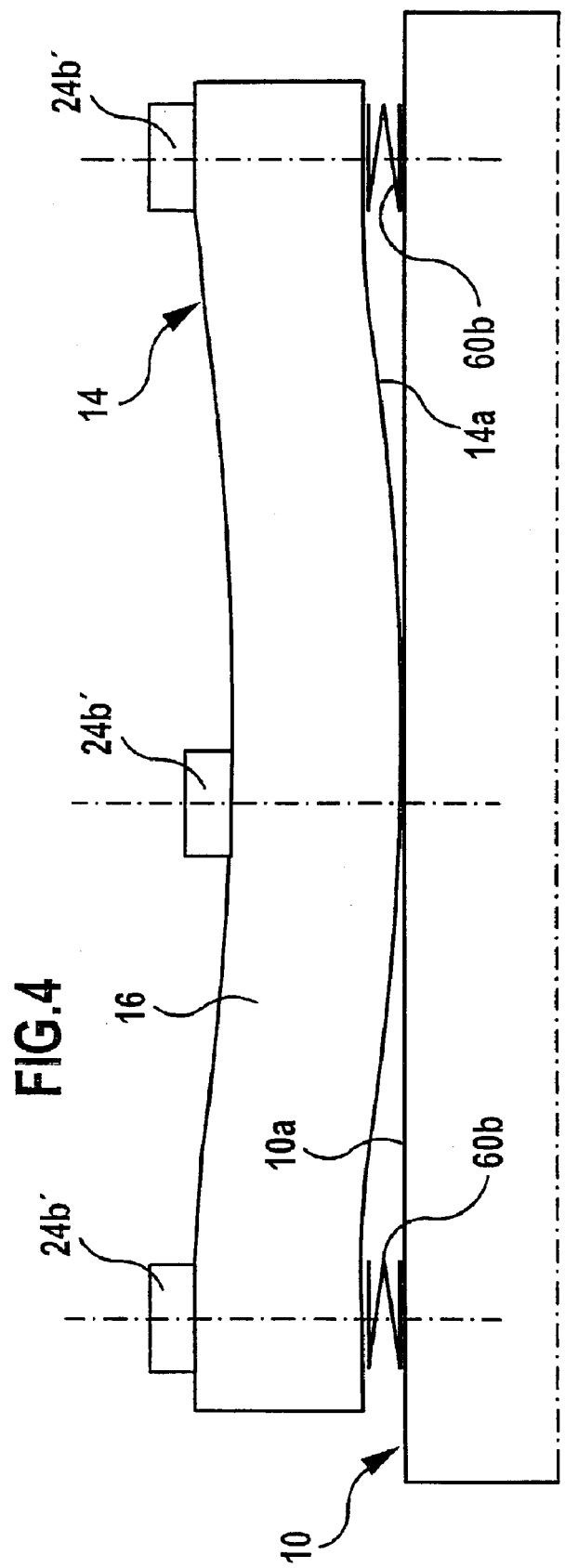

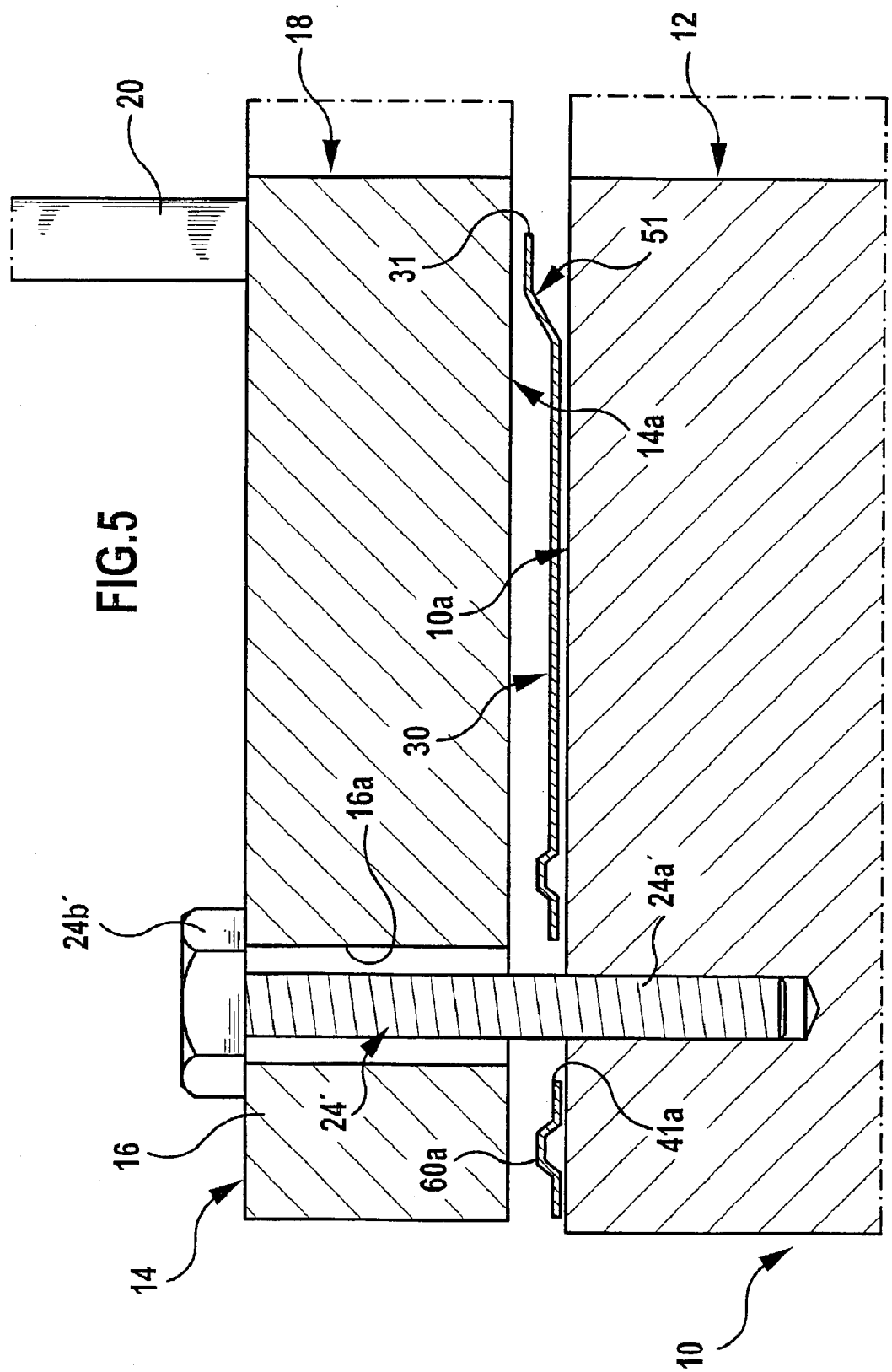

FLAT GASKET, IN PARTICULAR EXHAUST MANIFOLD GASKET, AND ASSEMBLY ACCOMMODATING SUCH A GASKET

The present disclosure relates to the subject matter disclosed in German application No. 102 58 319.6 of Dec. 13, 2002, which is incorporated herein by reference in its entirety and for all purposes.

BACKGROUND OF THE INVENTION

The invention relates to a flat gasket for sealing a sealing gap between sealing surfaces facing one another on machine components containing several passages for hot fluids (such as exhaust gases of internal combustion engines), which open into fluid ports formed at locations opposite one another in the machine component sealing surfaces, a gasket plate of the flat gasket which is to be clamped between the machine component sealing surfaces and comprises at least one sheet metal layer having for each pair of fluid ports located opposite one another on the two machine components a fluid passage opening, associated with which is at least one sealing element of the gasket plate, which encloses the fluid passage opening, and the gasket plate having adjacent to the fluid passage openings several screw holes for the passage of screws serving to clamp the flat gasket between the machine component sealing surfaces.

The invention further relates to an assembly with a cylinder head and an exhaust manifold having a flange which is joined to the cylinder head by means of screws which each have a threaded shaft, and with a flat gasket clamped between the cylinder head and the exhaust manifold flange.

In the following the problem underlying the invention will be explained with reference to an exhaust manifold gasket for a modern internal combustion engine, although the invention is of advantage to all systems in which a flat gasket is clamped between two machine components which have substantially different temperatures while the machine is in operation or during an operational phase.

When a cold internal combustion engine is put into operation, the flange of an exhaust manifold which is to be connected to a cylinder head by screws with the interposition of an exhaust manifold gasket exhibits considerable displacements in the plane of the so-called sealing gap defined by the sealing surfaces of the cylinder head and the exhaust manifold flange accommodating the exhaust manifold gasket between them. The causes of the movements of the sealing surfaces of cylinder head and exhaust manifold flange relative to one another are to be seen in the following: The high exhaust gas temperatures (up to approximately 900° C.) heat up the exhaust manifold quickly, whereas the cylinder head remains relatively cool on account of it being cooled by the coolant of the internal combustion engine, and the exhaust manifold gasket impedes heat exchange between cylinder head and exhaust manifold, which results in a high temperature gradient between these two machine components. Furthermore, in these modern engines the materials of cylinder head and exhaust manifold have quite different coefficients of thermal expansion, as the cylinder head consists of a light metal alloy, whereas the exhaust manifold is a welded construction of steel parts or a gray cast iron part. It must, however, be ensured that in each operational phase of the internal combustion engine the sealing gap between cylinder head and exhaust manifold flange is reliably sealed by the exhaust manifold gasket.

In this connection, particular heed must be paid to the connection between cylinder head and exhaust manifold, which is made by means of screws with a screw head screwed into threaded bores of the cylinder head or by threaded bolts with nuts screwed onto these. In this respect, two extreme constructions will first be considered:

(1) rigid connection of the exhaust manifold with the cylinder head, in particular, by the above-mentioned screws or nuts being tightened with a very high tightening torque, and (2) connection of the exhaust manifold with the cylinder head such that exhaust manifold flange and cylinder head are displaceable relative to one another.

The rigid connection (1) requires a firm exhaust manifold flange which is followed by a relatively flexible area of the exhaust manifold which can elastically absorb the thermal expansions which occur. Such partially flexible exhaust manifolds are often found in racing car engines with a so-called high-performance header in the form of a welded construction in which several tubes lead from an exhaust manifold flange to a common exhaust pipe. However, such a construction occupies a relatively large constructional space and is also complicated to manufacture. As the different thermal expansions of cylinder head and exhaust manifold lead to the aforementioned screws or threaded bolts being subjected to shearing and tensile stresses, the rigid connection (1) in high-performance headers results in the exhaust manifold flange being subjected to high bending stresses and often also undergoing plastic deformation while the engine is running, which results in an uneven sealing surface of the exhaust manifold flange.

The connection (2) permitting displacements is often found in exhaust manifolds in the form of castings since with a rigid connection (1) the relatively thick-walled castings lead to enormous thrust forces while the engine is running, which can shear off screw or threaded shafts or destroy the threads of the threaded bores provided in the cylinder head. Representative of such a type of connection is the solution already put into practice by ElringKlinger AG, which will be explained in greater detail hereinbelow with reference to FIG. 1. In this construction, the connection between exhaust manifold and cylinder head is made with long screws whose heads are not supported directly on the exhaust manifold flange, but on sleeves which are penetrated by the screw shafts and which themselves, in turn, are supported on the exhaust manifold flange. The screw shafts penetrate the sleeves and the exhaust manifold flange with radial play with respect to the screw shaft axis so that sliding movements between exhaust manifold flange and cylinder head can be elastically absorbed by the screw shafts—the long screw shafts can bend elastically. However, this solution to the problem requires additional components, namely the sleeves, a higher assembly expenditure and a larger constructional space (owing to the screws and sleeves projecting significantly beyond the exhaust manifold flange).

The object underlying the invention was to create a flat gasket for the aforementioned purposes, which, on the one hand, allows sliding movements between the machine components (e.g. cylinder head and exhaust manifold), but, on the other hand, is employable more cost-effectively than the above-described known construction with long screws and sleeves.

SUMMARY OF THE INVENTION

To accomplish this object, it is proposed, in accordance with the invention, that there be integrated into the gasket in all screw hole areas of the gasket plate in which relative movements are to be permitted, spring elements which are designed such that when the gasket is installed and pressed, they are subjected to pressure and are elastically deformable in a direction perpendicular to the gasket plate, in the sense of both a reduction and an increase in the thickness or height of the spring elements. When a flat gasket according to the invention is employed, the screws or threaded shafts, with which spring elements are associated, are not overstressed in the longitudinal direction of the screw shaft by the stronger heating of one machine component (which may cause plastic elongation of the screw shaft or damage to the thread of the threaded bore in the other machine component) because the spring element is still further compressible also after installation of the gasket. In addition, where spring elements are provided in the screw hole areas, sliding movements of one machine component relative to the other machine component can take place relatively unimpeded as the specific surface pressure there between the flat gasket and the sealing surfaces of the two machine components is lower than if an incompressible gasket plate area were clamped there between the machine component sealing surfaces. Owing to the lower specific surface pressure, sliding movements do not cause any damage to the machine component sealing surfaces either. Furthermore, as the solution according to the invention permits relative movements of the two machine components, in comparison with a rigid connection the risk of plastic deformations occurring on the hotter machine component or on either of the two machine components during operation is reduced. Finally, in comparison with the known solution of ElringKlinger AG as explained hereinabove, components, namely the sleeves, can be economized on, and the constructional space requirement reduced, as the screw heads or the nuts to be screwed onto the threaded shafts can be supported directly on one machine component (possibly also via flat and inexpensive plain or toothed washers).

Of course, the screw holes provided in the gasket plate, in the area of which the gasket plate is provided with spring elements, must receive the screw or threaded shafts with radial play in order that the sliding movements described hereinabove can take place without the occurrence of warping or the like in the gasket plate and/or the aforementioned shafts being subjected to shearing stress.

In spite of all thermal expansions and relative sliding movements, in order to also provide a fixed point (or several fixed points lying relatively close to one another), in which the gasket is fixed with respect to the two machine components, it is recommendable to design a flat gasket according to the invention such that the gasket comprises at least one screw hole without a spring element, in the area of which the joint between the two machine components and the flat gasket is virtually rigid.

A flat gasket is provided according to the invention, with which both is achieved.

Attention is also called to the fact that the spacing of the screw holes from the fluid passage openings is an uncritical parameter in terms of the invention and may as such be of optional size. However, for reasons of reliable sealing around the fluid passage openings this spacing will not be made unnecessarily large.

As mentioned hereinabove, the flat gasket according to the invention is suitable, above all, for exhaust manifold gaskets. However, other fields of use are, for example, flange connections to a turbocharger or an EGR valve.

When a gasket plate comprising several fluid or exhaust gas passage openings has an elongate shape, it is recommendable to arrange the aforementioned fixed point in the form of the screw hole without a spring element in a central area of the gasket plate with respect to the longitudinal direction of the gasket plate, as the maximum relative movements occurring are then smaller than if the fixed point were, for example, located in an end area of the gasket plate.

A spring element of a flat gasket according to the invention could, for example, have the shape of a conventional spring washer, which like the conventional plain washers, is penetrated by a screw shaft and is attached to the gasket plate in a suitable way, for example, by spot welding. In the case of substantially metallic gasket plates comprising one or several sheet metal layers, it is, however, much simpler and less expensive to shape an area of such a sheet metal layer into a spring element so that the latter is formed by at least one stamped elevation of a spring-elastic area of a sheet metal layer of the gasket plate. After the stamping procedure, this sheet metal layer could be heat-treated locally in the area of the later spring element such that the stamped area acquires spring-elastic properties. However, since sheet spring steel is often worked in the manufacture of at least substantially metallic flat gaskets, embodiments are recommended, in which the sheet metal layer provided with the spring element is a layer of sheet spring steel.

The spring element could be formed by one or several stamped elevations, for example, by knob-shaped elevations arranged around a screw hole. However, in order to make the carrying properties of the spring element around a screw hole uniform, it is recommendable to design the spring element as a bead formed in a sheet metal layer, which encloses a screw hole preferably completely in the shape of a ring. The bead could be a so-called half-bead with a cross section corresponding to a flattened Z. However, so-called full beads are preferred, whose cross-sectional shape corresponds approximately to a U or a circular arc, as the supporting capability of such a full bead is greater than that of a half-bead. The spring element could, of course, also be formed by several, in particular concentric, beads.

If the gasket plate has an elongate shape and the fluid passage openings are arranged at least approximately one behind the other in the longitudinal direction of the gasket plate, it is, in general, recommendable to provide only a single fluid passage opening with a screw hole which is without a spring element adjacent to this fluid passage opening in the gasket plate, although it would, in principle, be possible to allocate screw holes without a spring element to two adjacent fluid passage openings.

In exhaust manifold gaskets the gasket plate usually has one screw hole on either side of each exhaust gas passage opening. In inventive flat gaskets of such design it is then recommendable not to provide a spring element for either of the screw holes adjacent to that fluid passage opening in whose area the fixed point is to be placed.

The gasket plate of a flat gasket according to the invention may be single-layered or multilayered. A multilayered gasket does, of course, have a positive effect with respect to facilitating sliding movements (with a multilayered gasket the spring elements may be provided on any optional layer or also on different layers since the specific surface pressure between the flat gasket and the machine component sealing surfaces in the area of a spring element according to the invention—in comparison with an area comprising a screw hole without a spring element—is at any rate reduced). The invention does, however, allow inventive flat gaskets to be designed as single-layered gaskets which then, of course, are particularly cost-effective.

As for the screws with which a cylinder head of an internal combustion engine is screwed to its engine block, the tightening torque for those screws with which an exhaust manifold is attached to the cylinder head in the course of assembly of the engine is also predetermined. It is recommendable to design the spring element or the spring elements of the flat gasket according to the invention such that when clamping the flat gasket, with respect to the spring elements a balance of forces is created with a predetermined tightening torque for the assembly screws, which leaves a small gap open between the sealing surfaces of the machine components (i.e., for example, cylinder head and exhaust manifold) and the flat gasket, and this gap is to be of such dimensions that when one machine component heats up or the two machine components heat up to a different degree this gap does not disappear completely and therefore displacements in the plane of the sealing gap can take place without any great obstruction. Therefore, in accordance with the invention, the spring element is designed such that with a predetermined tightening torque for the screws serving to clamp the gasket plate, the spring element of the clamped gasket plate is still capable of undergoing spring-elastic deformation in both directions perpendicular to the gasket plate.

In this connection, attention is called to the fact that it is advantageous for the sealing elements of the gasket plate enclosing the fluid passage openings of the flat gasket to be capable of such elastic deformation in a direction perpendicular to the gasket plate that the flow paths between the fluid ports of the machine component sealing surfaces and the fluid passage openings of the flat gasket are reliably sealed by these spring elements in any state of the machine components.

For reasons of simpler handling and assembly, the fluid passage openings of the flat gasket according to the invention are, in general, formed in a single, continuous gasket plate, and the partial areas of the gasket plate associated with the individual fluid passage openings may be joined to one another via bridges formed by the gasket plate, which are capable of elastic deformation in the longitudinal direction of the gasket plate. In large internal combustion engines, in particular in commercial vehicle engines, however, a separate cylinder head is often allocated to each combustion chamber, and a separate cylinder head gasket is also arranged between the cylinder head and the engine block. For this reason, attention is called to the fact that the gasket plate of the flat gasket according to the invention may also be divided up, with the gasket being divided between adjacent exhaust gas passage openings into several partial gaskets, each of which contains at least one exhaust gas passage opening. A partial gasket may therefore contain a single exhaust gas passage opening or, for example, two adjacent exhaust gas passage openings. In accordance with the invention, one of the partial gaskets is then designed so as to form a fixed point in the sense of the above definition. The other partial gaskets may then be fixed in position, for example, via narrow screw holes at the screws or via fitting pins.

In the context of the present invention, exhaust gas passage openings are to be understood as both the openings for the passage of exhaust gases coming from the engine and an opening for the passage of exhaust gas to be led back into the engine.

As mentioned above, the invention also relates to an assembly with a cylinder head and an exhaust manifold having a flange which is joined to the cylinder head by means of screws, each of which has a threaded shaft, and with an inventive flat gasket clamped between the cylinder head and the exhaust manifold flange, and this assembly is characterized in accordance with the invention in that the heads of the screws or nuts screwed onto the threaded shafts are supported on the exhaust manifold flange without the interposition of a spacer element such as the aforementioned sleeve. In this context, however, a spacer element is not to be understood as a simple plain washer or the like, but only as a spacer element which, like such a sleeve, requires significantly longer screws or threaded shafts and/or has a certain spring-elasticity. Accordingly, an assembly according to the invention is, in particular, not to comprise any such spacer elements which under the influence of the tensile forces acting on the screws or threaded shafts act like an albeit stiff spring.

To fix a flat gasket according to the invention in position, at least one fitting pin, which is inserted without any play into a bore in one of the two machine components or into bores of both machine components and extends play-free through a hole in the gasket plate, could also be used.

As is apparent from the above explanations, the spring element according to the invention is to be designed so as to able to absorb considerable compressive strains without departing from the spring-elastic range of its deformation. The latter is also to apply to the screw or threaded shafts of an assembly according to the invention.

It is advantageous for the flat gasket according to the invention to be provided on one or both of its main surfaces with a slide coating, as is known, for example, from cylinder head gaskets. Such a slide coating may, for example, consist of PTFE. Such a slide coating enables displacement of the sealing surfaces of the two machine components lying on either side of the flat gasket with greater ease relative to one another.

The invention will be described in greater detail hereinbelow with reference to the appended drawings.

BRIEF DESCRIPTION OF THE DRAWINGS

FIG. 4 shows a schematic illustration of an assembly according to the invention for elucidating the principle underlying operation of the present invention, with the inventive flat gasket omitted and only its spring elements shown symbolically; and FIG. 5 shows an illustration corresponding to FIG. 1 of an assembly according to the invention.

DETAILED DESCRIPTION OF THE INVENTION

Figure 1:
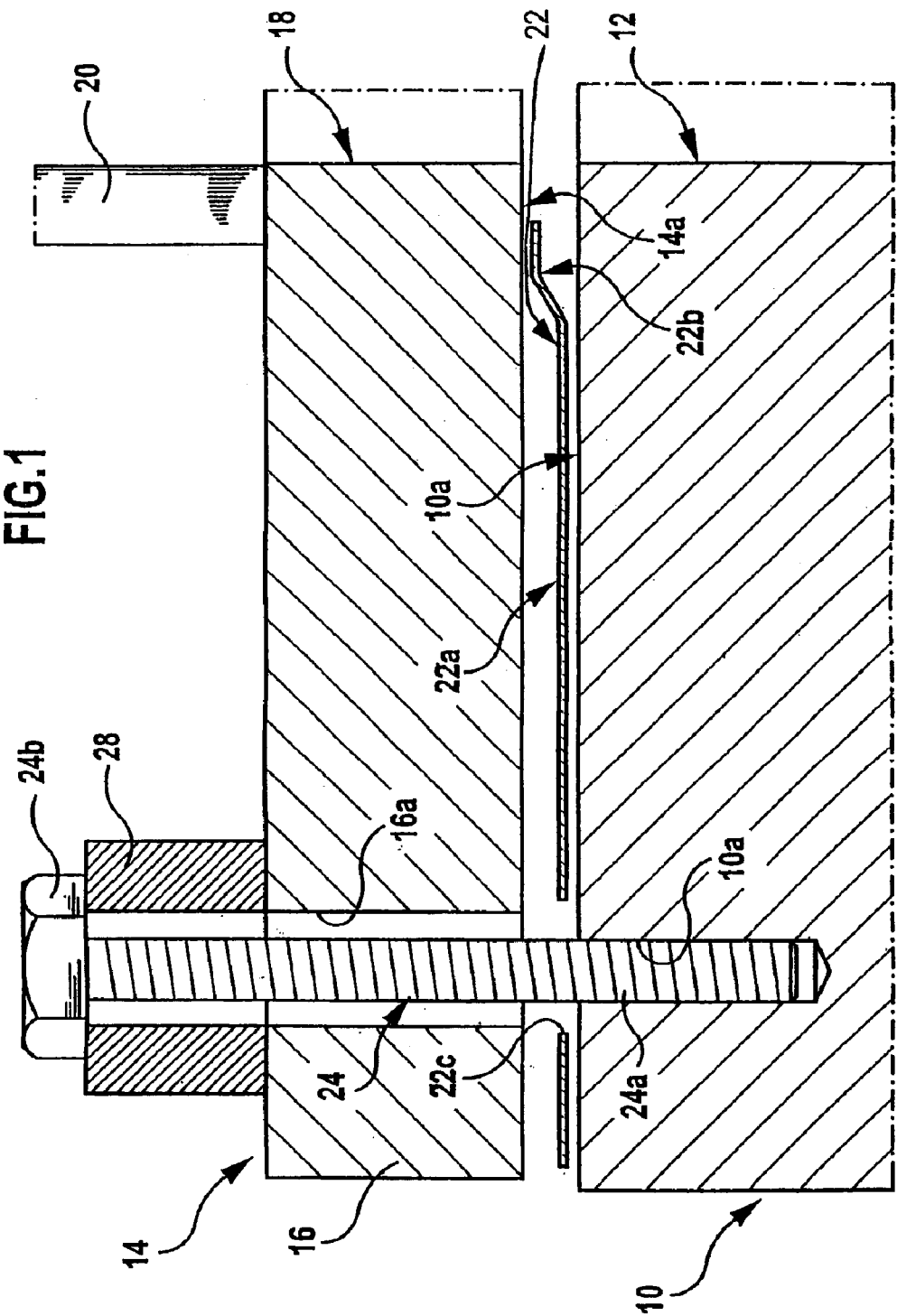
FIG. 1 shows a schematic section through part of an assembly corresponding to the state of the art which has already been implemented by ElringKlinger AG and comprising a cylinder head, an exhaust manifold, an exhaust manifold gasket arranged between these and the elements serving to clamp these parts together.

FIG. 1 shows schematically part of a cylinder head 10 which ends at an exhaust gas port 12, and part of an exhaust manifold 14, of which part of an exhaust manifold flange 16 is shown, which ends at an exhaust gas port 18 of the exhaust manifold, which is connected to an exhaust pipe 20 of the exhaust manifold, which is joined, for example, by welding to the flange 16. Between sealing surfaces 10a and 14a of the cylinder head 10 and the exhaust manifold 14, which face one another, there lies an exhaust manifold gasket 22 which is to be clamped by means of screws 24, only one of which is shown in FIG. 1, between the sealing surfaces (FIG. 1 shows a state prior to tightening of the screws 24). The cylinder head 10 has a threaded bore 10a for the threaded shaft 24a of each screw 24. This threaded shaft 24a extends with radial play through a bore 16a in the exhaust manifold flange 16 and through a metallic sleeve 28 which is supported on the exhaust manifold flange 16 and, in turn, forms an abutment for the screw head 24b of the screw 24 (a nut screwed onto the threaded shaft 24a could also replace the screw head 24b).

The exhaust manifold gasket 22 is intended to be a single-layered metallic gasket whose gasket plate 22a is planar, except in the area of sealing elements 22b, and has for each screw 24 a screw hole 22c through which the threaded shaft 24a extends with radial play. The sealing elements 22b shown in the drawing are intended to be so-called half-beads which enclose an exhaust gas port 12 and 18, respectively, in the shape of a circular ring, and when the screws 24 are tightened, i.e., when the gasket 22 is clamped, are elastically supported on the sealing surface 10a, on the one hand, and on the sealing surface 14a, on the other hand.

When the exhaust manifold 14, and, in particular, its flange 16, is heated up more quickly, after starting the engine, and reaches higher temperatures than the cylinder head 10, the exhaust manifold flange 16 increases in length, for example, in horizontal direction in accordance with FIG. 1, to a much greater extent than the cylinder head 10, which results in the sealing surface 14a having the tendency to undergo displacement in a horizontal direction relative to the sealing surface 10a. Insofar as this is not prevented by the slide friction between the exhaust manifold gasket 22 and the two sealing surfaces 10a and 14b, such relative displacement results in a bending stress on the threaded shaft 24a and, albeit to a slight extent, in an additional tensile stress on the threaded shaft, which results from the ensuing bending angle of the threaded shaft 24a. Owing to the sleeves 28 and the large length of the threaded shafts 24a required for these, the consequences of the sliding movements described hereinabove can be elastically compensated by the screws 24 and the sleeves 28.

On the other hand, use of the sleeves 28 and long screw or threaded shafts results in higher material and assembly costs as well as in an increase in the required constructional space around the height or length of the sleeves 28.

Figures 2, 3:
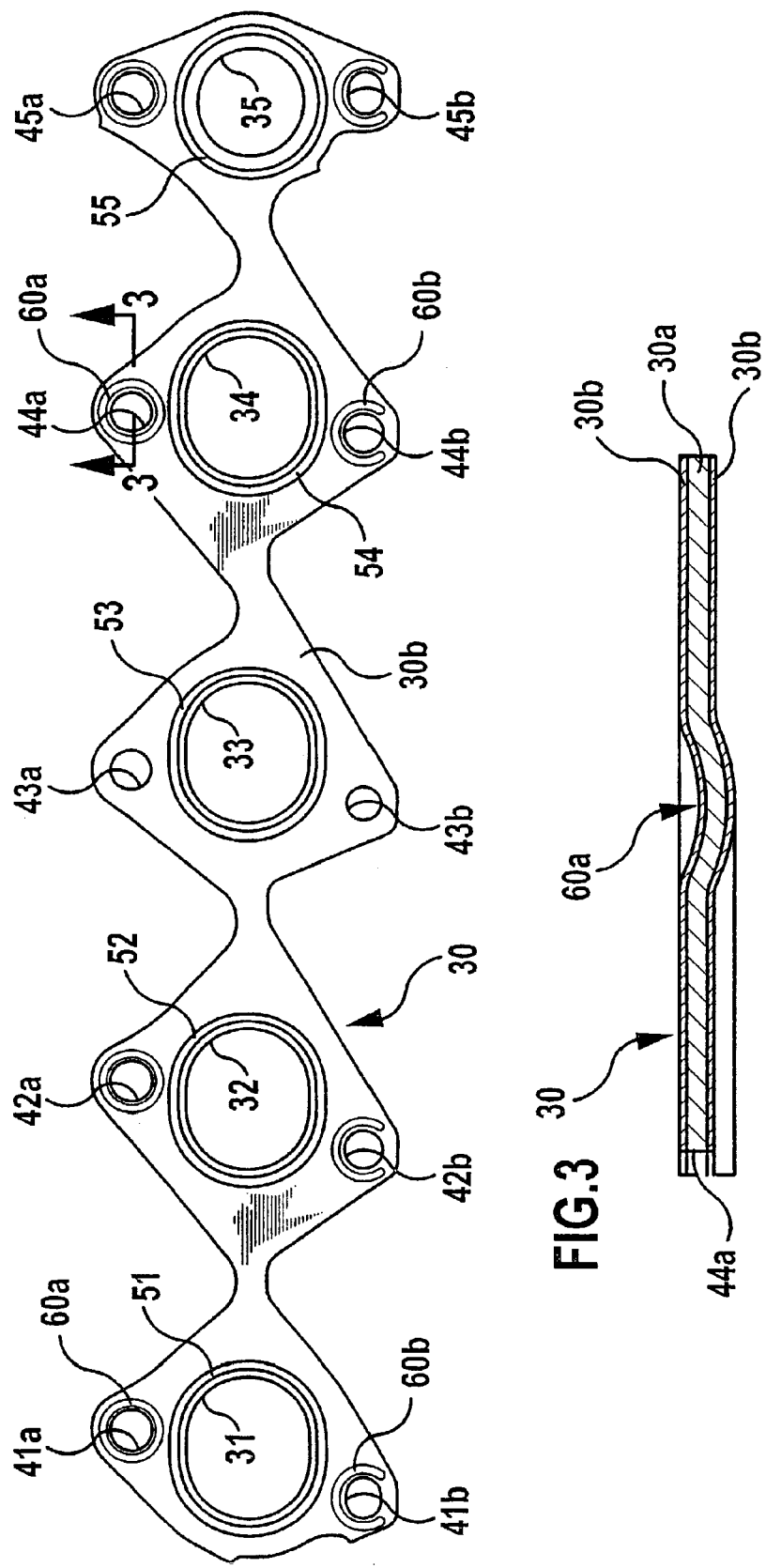
FIG. 2 shows a plan view of an inventive flat gasket designed as an exhaust manifold gasket.
FIG. 3 shows a section through this gasket taken on line 3—3 in FIG. 2.

The exhaust manifold gasket shown in FIGS. 2 and 3 likewise has a gasket plate 30 made of a single sheet metal layer 30a with a slide coating 30b on either side thereof. The gasket is intended for a 4-cylinder engine or for a cylinder bank of an 8-cylinder V-engine having an exhaust gas recirculation system. The gasket plate 30 therefore has five exhaust gas passage openings, namely exhaust gas passage openings 31, 32, 33 and 34 for the so-called exhaust gas ports which are associated with the four combustion chambers, and exhaust gas passage opening 35 for the exhaust gas recirculation. Associated with each exhaust gas passage opening in the gasket plate 30 are two screw holes 41a, 41b; 42a, 42b; 43a, 43b; 44a, 44b; and 45a, 45b, which are located on opposite sides of the respective exhaust gas passage opening with respect to the longitudinal center axis of the gasket plate. Around each exhaust gas passage opening there extends a spring-elastic sealing element 51, 52, 53, 54 and 55, respectively, which encloses the respective exhaust gas passage opening in the shape of a ring and in the illustrated embodiment is intended to have the configuration of a bead obtained by a stamping procedure in the sheet metal layer—this could be a so-called full bead, but in the illustrated exhaust manifold gasket it is a so-called half-bead whose cross-sectional shape corresponds approximately to a flattened Z.

In the illustrated gasket according to the invention, the central gasket area represents a fixed point within the meaning of the above statements. For this reason, the screw holes 43a and 43b associated with the central exhaust gas passage opening 33 are not provided with a spring element according to the invention. Furthermore, the diameter of the screw holes 43a and 43b corresponds to the diameter of the shaft of the screws or threaded shafts that are used, so that these shafts extend through the screw holes 43a and 43b free from play. The gasket plate 30 is therefore planar around the screw holes 43a and 43b.

All other screw holes, on the other hand, are provided with spring elements 60a and 60b, respectively, according to the invention, and have a hole diameter which is larger than the diameter of the shaft of the screws or threaded shafts that are used, so that these shafts extend through the screw holes 41a to 42b and 44a to 45b with radial play and permit sliding movements, extending in the drawing plane of FIG. 2, of those parts of an exhaust manifold flange which lie on either side of the central gasket plate area accommodating the exhaust gas passage opening 33 and the screw holes 43a, 43b.

All spring elements 60a and 60b are in the form of beads, in particular, so-called full beads, which were obtained by stamping the sheet metal of the gasket plate 30 and have an approximately circular arc-shaped cross section (see FIG. 3). Whereas the spring elements or beads 60a enclose the associated screw holes completely in the shape of a ring, the spring elements or beads 60b do not extend completely, but only for the most part, around the associated screw holes.

FIGS. 4 and 5 show an assembly according to the invention, again very schematically, to elucidate the difference over the state of the art shown in FIG. 1 and the way in which the invention operates. To a large extent, the same reference numerals were used in FIGS. 4 and 5 as in FIGS. 1 and 2, in some instances with the addition of a prime.

FIG. 5 shows an illustration corresponding to FIG. 1, in the area of the screw hole 60a and the exhaust gas passage opening 31 of the inventive flat gasket shown in FIG. 2, and, for the sake or greater clarity, as in FIG. 1 a state was drawn in which the screws for attaching the exhaust manifold are not yet tightened and the inventive flat gasket is not yet clamped.

In the assembly shown in FIG. 5, the screw head 24b' is supported directly on the exhaust manifold flange 16, however, a conventional plain or toothed washer could also be provided between the screw head and the exhaust manifold flange.

FIG. 4 does not correspond to FIG. 2 insofar as, for reasons of simplicity, the gasket and the screws associated with the exhaust gas passage openings 32 and 34 were omitted. The spring elements 60b were symbolically represented by helical springs, and only the screw heads 24b' of the screws were indicated. As indicated in FIG. 4, in the area of the longitudinal center of the exhaust manifold flange 16 its sealing surface 14a is pulled downwards by the screws arranged there to such an extent in accordance with FIG. 4 as the thickness of the gasket plate 30 of the inventive flat gasket, not shown in FIG. 4, allows, whereas outside of this central area of the exhaust manifold flange 16 an open gap exists between the sealing surfaces 10a and 14a and the gasket, not shown, in order to permit the sliding movements described hereinabove, which are not impeded to any considerable extent by the spring elements according to the invention.

What is claimed is:

1. Flat exhaust manifold gasket for sealing a sealing gap between sealing surfaces facing one another on machine components that comprise a cylinder head and a flange of an exhaust manifold of an internal combustion engine, said machine components containing several exhaust gas passages opening into exhaust gas ports formed at locations opposite one another in the machine component sealing surfaces, said gasket having a gasket plate which is to be clamped between the machine component sealing surfaces and comprises at least one sheet metal layer having for each pair of said ports located opposite one another on the two machine components an exhaust gas passage opening, associated with which is at least one sealing element of the gasket plate, which encloses the exhaust gas passage opening and is capable of undergoing elastic deformation in a direction perpendicular to the gasket plate, and the gasket plate having adjacent to the exhaust gas passage openings several screw holes for the passage of threaded shafts serving to clamp the flat gasket between the machine component sealing surfaces, wherein the gasket plate has for at least a first one of its exhaust gas passage openings in the area of at least one screw hole adjacent to this exhaust gas passage opening at least one spring element which is subjected to pressure when the gasket is fitted, and is capable of undergoing elastic deformation in both directions perpendicular to the gasket plate, and wherein the gasket plate has for only a single second one of its exhaust gas passage openings adjacent thereto at least one screw hole without such a spring element to thereby prevent at this spring element-free screw hole relative sliding movement of said machine components along the gasket and allow relative sliding movement of said machine components along the gasket at the at least one screw hole associated with said at least one spring element during operation of the internal combustion engine.

2. Flat gasket as defined in claim 1, the gasket plate having an elongate shape, and the exhaust gas passage openings being arranged at least approximately one behind the other in the longitudinal direction of the gasket plate, wherein the at least one screw hole without a spring element is arranged in a central area of the gasket plate with respect to the longitudinal direction of the gasket plate.

3. Flat gasket as defined in claim 1, wherein the spring element is formed by at least one stamped elevation of a spring-elastic sheet metal layer of the gasket plate.

4. Flat gasket as defined in claim 3, wherein the sheet metal layer provided with the spring element is a layer of sheet spring steel.

5. Flat gasket as defined in claim 3, wherein the stamped elevation is formed as a bead.

6. Flat gasket as defined in claim 5, wherein the bead is a full bead.

7. Flat gasket as defined in claim 1, wherein the spring element encloses the at least one screw hole substantially in the shape of a ring.

8. Flat gasket as defined in claim 1, wherein all screw holes adjacent to said single second one of the exhaust gas passage openings are without a spring element.

9. Flat gasket as defined in claim 1, wherein the gasket plate comprises only a single sheet metal layer.

10. Flat gasket as defined in claim 1, wherein the spring element is designed such that given a predetermined tightening torque for the screws serving to clamp the gasket plate, the spring element of the clamped gasket plate is still able to undergo elastic deformation in both directions perpendicular to the gasket plate.

11. Flat casket as defined in claim 1, wherein the gasket between adjacent exhaust gas passage openings is divided up into several partial gaskets, each of which contains at least one exhaust gas passage opening.

12. Assembly with a cylinder head and an exhaust manifold having a flange which is joined by means of threaded shafts and nuts or by means of screws to the cylinder head, and with a flat gasket as defined in claim 11 clamped between the cylinder head and the exhaust manifold flange, wherein heads of the screws or nuts screwed onto the threaded shafts are supported on the exhaust manifold flange without the interposition of a spacer element.

13. Assembly with a cylinder head and an exhaust manifold having a flange which is joined by means of threaded shafts and nuts or by means of screws to the cylinder head, and with a flat gasket as defined in claim 1 clamped between the cylinder head and the exhaust manifold flange, wherein heads of the screws or nuts screwed onto the threaded shafts are supported on the exhaust manifold flange without the interposition of a spacer element.

* * * * *